Feb. 17, 1959 J. A. DREYFUS 2,874,251
ELECTRICAL CONTACT DEVICE HAVING ADJUSTABLE CONTACTS
Filed May 7, 1956 3 Sheets-Sheet 1
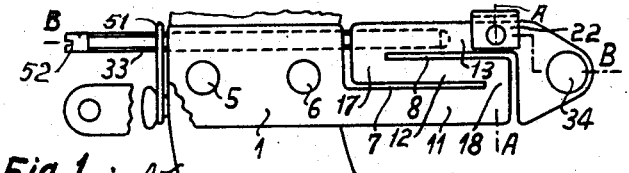
Fig.1
Fig.4
Fig.2
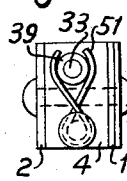
Fig.5
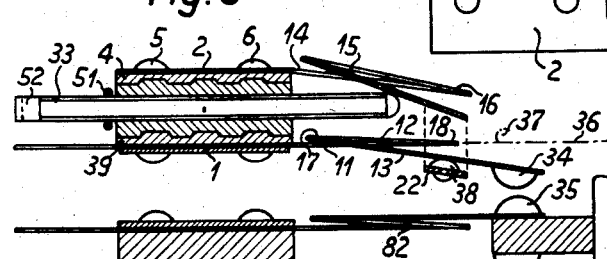
Fig.3
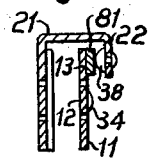
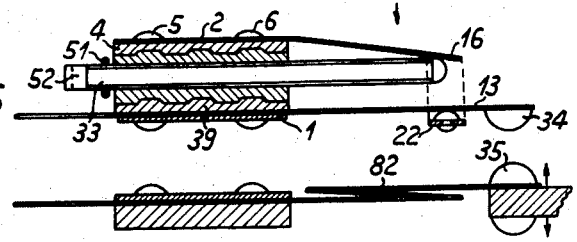
Fig.6
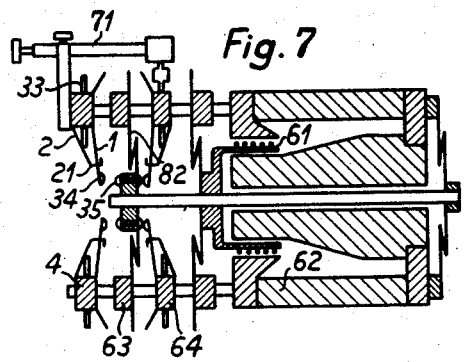
Fig.7
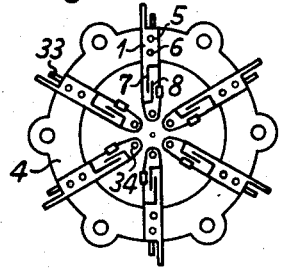
Fig.8
INVENTOR.
JEAN ALBERT DREYFUS
BY

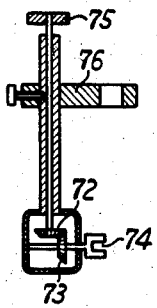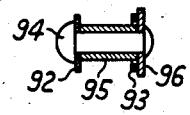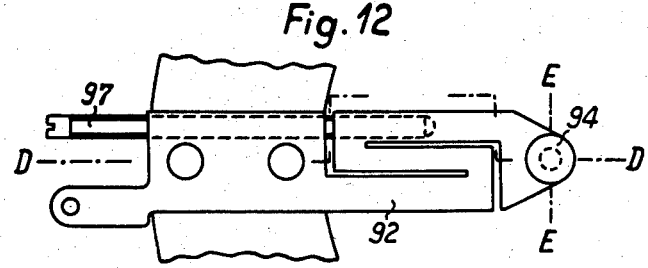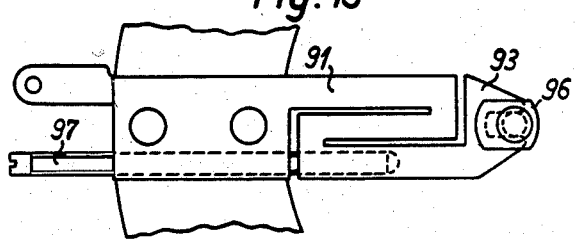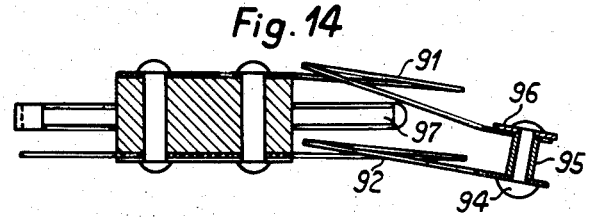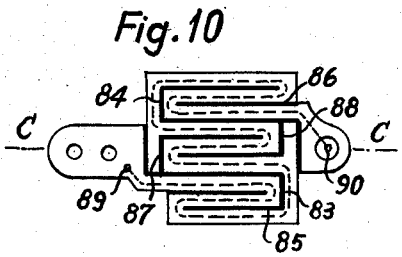

Feb. 17, 1959   J. A. DREYFUS   2,874,251
ELECTRICAL CONTACT DEVICE HAVING ADJUSTABLE CONTACTS
Filed May 7, 1956   3 Sheets-Sheet 3
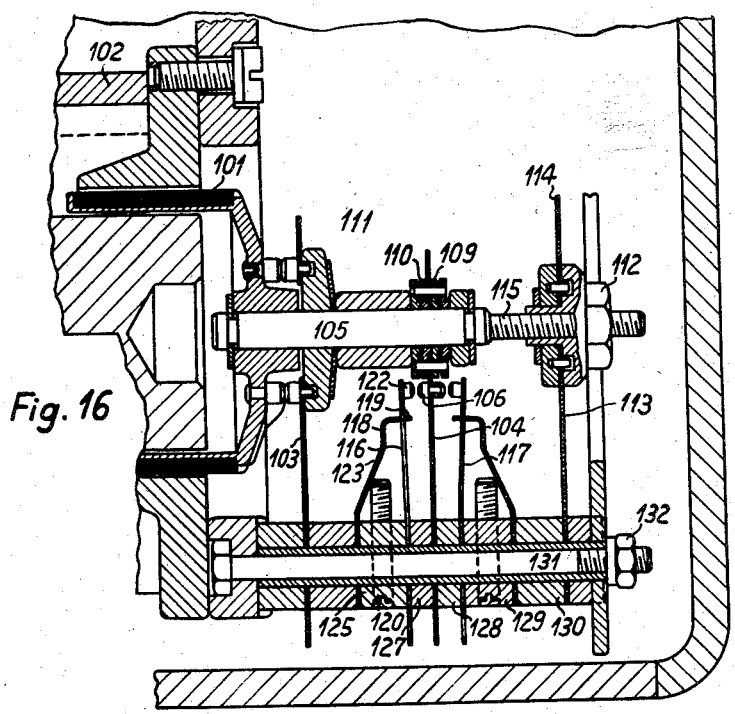
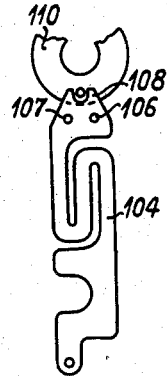
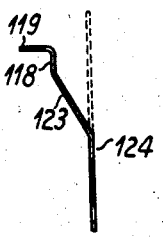
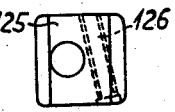
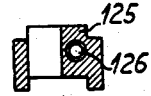
INVENTOR.
JEAN ALBERT DREYFUS
BY United States Patent Office 2,874,251
Patented Feb. 17, 1959

2,874,251

ELECTRICAL CONTACT DEVICE HAVING ADJUSTABLE CONTACTS

Jean Albert Dreyfus, Geneva, Switzerland

Application May 7, 1956, Serial No. 583,143

Claims priority, application Switzerland May 9, 1955

9 Claims. (Cl. 200—166)

The present invention relates to an electrical contact device having adjustable contacts and more particularly to a device having at least one movable and one stationary laminar spring or strip, each spring or strip being provided with an electrical contact. Devices of this type which may be used as relays are operated by means of stationary or movable coils under the influence of an electrical current supplied to said coils, which in turn actuate said movable contact strips. In connection with the stationary contact strip an absorber strip is often used, which is shorter and thicker than the former and which is arranged on the same side of the strip as its contact, i. e. on the side facing the movable strip. This absorber strip serves to limit and absorb the oscillations of the stationary strip which are imparted by the movable contact. Furthermore it is known to employ an adjusting screw to position the stationary strip, the axis of this screw extending substantially perpendicular to the plane of the strip.

In accordance with the present invention an absorber strip is provided on the side of the stationary strip opposed to the side of its contact, which absorber strip is mechanically coupled with said stationary strip by a hook member, engaging said stationary strip under pressure.

Thus the oscillations of the stationary strip are effectively absorbed due to its connection with the resilient absorber strip. In addition, it is possible to arrange an adjusting screw between the two resilient strips, the axis of which extends substantially parallel with respect to the contact strip in its position of rest. This screw cooperates with an inclined or bent portion of the absorber strip. As a result two important advantages may be gained, i. e. a further oscillation absorbing effect under the influence of the screw raising the oscillation frequency proper of the two, and a precise progressive adjustment of the position of the contact of the stationary strip over the above mentioned hook member. This arrangement requires very little space and permits the employment of a large number of sensitive adjustable contacts.

Whereas in conventional relays the adjustment of contact positions must be made by permanent i. e. plastic deformation of the strips by means of pliers, the present invention permits a progressive and sensitive adjustment of the aforesaid contact positions by elastic deformation only.

A preferred embodiment of the invention utilizes at least two slots in at least one strip of each contact set. These slots divide the strip in at least three angled resilient members connected one behind the other, i. e. in series. A strip of this type has been described in my U. S. Patent No. 2,540,660. It will be noted that the resilient members are connected with each other in a pivotable manner and each member may be given a suitable deformation.

In order that the invention may be better understood and put into practice several embodiments thereof are hereinafter described by way of example and with reference to the accompanying drawing, in which:

Figs. 1 and 2 show a first embodiment of the invention in elevation and in a side view respectively, drawn to a larger scale, Fig. 3 is a section along line A—A in Fig. 1, Fig. 4 is a detail view of the absorber strip of Figs. 1 and 2, the hook member being shown in development, Fig. 5 is a section along line B—B in Fig. 1, Fig. 6 shows the section of Fig. 5 after displacement of certain parts, Fig. 7 is a cross section through an electro-mechanical relay embodying the invention, Fig. 8 shows one of the crowns of Fig. 7 in elevation, Fig. 9 is a section through a schematically represented tool for the adjustment of the contacts, Fig. 10 is a modified type of a strip in elevation, Fig. 11 is a section along line C—C in Fig. 10, Figs. 12 and 13 are views from above and below, respectively of a further modification of a stationary contact strip and the associated absorber strip, Figs. 14 and 15 are sections along line D—D and line E—E, respectively in Fig. 12, Fig. 16 is a longitudinal section through a further electro mechanical relay, Fig. 17 shows a movable strip for two contacts in elevation, Fig. 18 shows a stationary strip for two contacts in elevation, Fig. 19 is an absorber strip in elevation and shown in stretched form, Fig. 20 is the absorber strip of Fig. 19 bent to shape, and Figs. 21 and 22 are elevation and section respectively of an insulating support.

In the embodiment shown in Figs. 1–5 the stationary member or strip 1 and the absorber member or strip 2 are connected to an insulating support or crown 4 by means of rivets 5 and 6. Each strip is provided with slots 7, 8 and 9, 10 respectively, forming three resilient elongated portions 11, 12, 13 and 14, 15, 16 respectively, in each strip. Transverse portions 17, 18 and 19, 20 respectively connecting these elongated portions serve as pivots thereof when the strips are subjected to deformation forces. By bending the strip of Fig. 4 about a right angle along the dotted lines a hook 21, 22 is obtained as shown in Fig. 3 connecting the strips 1 and 2.

On the one hand this hook permits to connect the two oscillating strips, affecting each other as absorber members, and on the other hand this hook transmits the displacements of the absorber strip 2 under the influence of an adjusting screw 33 to the contact strip 1. This adjusting screw is adapted for precise adjustment of the distance between the stationary contact 34 and the movable contact 35.

The portion 16 of the absorber strip 2 includes an acute angle 37 with respect to plane or position of rest 36 of the stationary strip 1, which angle may vary between 10° and 45° corresponding to the range and accuracy of adjustment desired. By careful predetermination of the deformations of the different portions of the strips 1 and 2 as well as by proper dimensioning of the height of the hook 21, 22, the surfaces 22 and 13 may be maintained in parallel relation with respect to each other. Thus when the screw 33 is turned for adjustment the hook 22 will simply glide along the member 13 of the absorber strip.

It will be understood that it is equally possible to provide the hook 22 with a semi-spherical portion 38 corresponding in shape and size to that of the contacts 34, 35; such that the wear of this portion 38 will be substantially equal to that of the contacts. In this manner wear of the contacts is compensated for by the portion 38 and disadjustment after prolonged operation effectively prevented.

The screw 33 is threaded into a sleeve 39 which is embedded in the insulating crown 4. The latter may be made of a resinous material, Bakelite impregnated paper, glass, ceramics, or other suitable material and may be produced by a turning moulding or pressing operation. The screw is secured in its adjusted position by a wire spring 51. Its end 52 is provided with a slot for engagement by a screw driver. Alternately the screw may also be provided with screw head for engagement by a spanner or a tubular wrench.

Fig. 6 which is similar to Fig. 5 shows a slightly different adjustment of the strips 1 and 2, due to the fact that the adjustment screw 33 is screwed into its innermost position thereby increasing the distance between the contacts 34 and 35.

According to Figs. 7 and 8 the movable contacts 35 are rigidly connected with a movable coil 61 extending into the air-gap of a permanent magnet 62. The stationary contacts 34 are supported by strips 1 adjusted over and connected for absorbtion of their oscillations with the strips 2 and the hooks 21 by means of the adjusting screw 33. The relay assembly shown in this figure comprises twelve contact strips distributed over the circumference of the insulating crowns 4 and 64 and extending radially inward therefrom.

The adjustment of the adjusting screws 33 may easily be carried out by means of a screw driver, if sufficient space around the relay is available. If the space available is limited, a tool 71 of the type shown in Fig. 9 may be employed. The tool 71 shown in Fig. 9 comprises a bevel gear 72, 73 the shafts of which extend at right angles. While one of the shafts is provided with an adjusting disc 75, the other carries at its outer end a tubular wrench 74, which may be rotated by rotation of the disc 75. The tool is provided with a support 76 adjustably secured by a screw 77, which may be brought into contact with the insulating crown, the distance between the wrench 74 and the lower side of the support 76 corresponding to the distance between the screw 33 and the upper side of the crown 4. Thus the screws 33 may be adjusted in a minimum of time even if the relay is surrounded by further devices, i. e. the space available is limited.

As shown in Fig. 1 the width of the transverse members 17 and 18 of the strip may be different. When the member 17, the elastic connection of which with the stationary contact is shorter than that of the member 18, is made of larger width than this member 18, an equal distribution of elastical deformation is obtained, i. e. equal shear forces are applied to the two members.

According to Fig. 3 the portion 38 of the coupling hook 21 may bear against a friction surface 81, which is provided on the member 13 of the stationary strip 1.

The friction surface may consist of graphite, hard or soft metal, rubber, plastic or other material suitable in view of absorbing characteristics or operational life. The movable contact strip 82 shown in Figs. 5, 6 or 7 may be of the same configuration as the stationary contact strip, being also provided with a plurality of slotted portions.

As shown in Figs. 10 and 11 the resilience of the stationary contact strip 1, the absorber strip 2 or of the movable contact strip 82 may be increased, if each of the three elongated members of the strip is subdivided in three further portions by means of pairs of slots; slots 83 and 84 are preferably U-shaped, slots 85 and 86 are preferably straight, and slots 87 and 88 are preferably L-shaped.

If the middle line of each member is followed from the origin of these members at 89 to the end at contact 90 it will be seen that nine elongated portions of the strip are resiliently connected in series, whereby a total resilience is obtained which is nine times greater than that of the strips 1 or 2.

In the embodiment shown in Figs. 12 to 15 the absorber strip 91 corresponds in its configuration to the stationary contact strip 92 with the exception that it ends in a bifurcated or forked portion 93. The stationary contact 94 is provided with a fastening member such as an elongated bolt extending through a sleeve 95 and securing a plate member 96 thereto. The latter serves as a hook to retain the absorber strip 91 and bears against a surface thereof, while the sleeve 95 engages the slot formed by the forked portion 93. The function of the adjusting screw 97 is similar to that of the adjusting screw described in connection with the embodiment of Fig. 1. The stationary contact strip 92 and the absorber strip 91 are each subjected to a predetermined constantly acting tension or stress, which tensions act in opposite directions due to a corresponding deformation of the two strips. Upon advancement of the adjusting screw 97, the deformation of the strip is reduced under a corresponding increase of the tension and the stationary contact 94 is displaced. A great sensitivity and therewith accuracy of the contact adjustment may be obtained if the adjusting screw is provided with a small pitch such as used for micrometer screws. The end member of the strip 91 extending parallel with respect to the corresponding end member of the strip 92, maintains its parallel relation due to the provision of the transverse connecting members acting as pivots of the elongated members of the strip.

In the embodiment shown in Figs. 16–22 a movable coil 101 is supported to extend into the annular air-gap of a permanent magnet 102 by means of a bronze strip 103 which is similar to the contact strip 104 shown in Fig. 17. The coil 101 is adapted to actuate or displace a shaft 105, which itself serves to act upon the strip 104 provided with the movable double contact 106, 107. The strip 104 ends in a forked portion 108 which is clamped between two insulating rings 109, 110. Thereby the difficulties of adjustment under internal stresses in the strip are avoided and a correct positioning thereof insured. An elastic disc 111 is provided to adjust the pressure exerted by the rings 109, 110. The position of the movable part of the relay including the coil 101 and the contacts 106 may be adjusted by a central nut 112, thereby permitting a displacement of the shaft 105 supported by the strips 113, 114, which are similar to the strip 104. To this end the shaft 105 includes a threaded portion 115, along which the nut may be moved to vary the deformations and tensions between the strips 103 and 104 with respect to the strip 113, whereby also the resonance frequency of the system may be varied.

In Fig. 18 the shape of the stationary strips 116 and 117 is shown. The absorber strips 118 (Figs. 19 and 20) end in a hook 119 adapted to engage the strips 116 and 117 and to adjust the position of these strips by means of an adjusting screw 120 as indicated in Fig. 16 to obtain the desired contact distance between the movable contacts 106, 107 and the stationary contacts 121, 122. The adjusting screw is adapted to engage a portion 123 of the absorber strip 118 which may assume an angle between 15° and 45°.

As shown in Figs. 21 and 22 the stationary strips 116 and 117 may be clamped between insulating members 125, each being provided with an internally threaded bore 126 inclined with respect to the axis of the member to receive the adjusting screw. The members 125 together with further members 127–130 may be arranged on a screw 131 and secured by a nut 132. Each of these members is provided with a nut which serves to guide the adjacent strips 116, 117 and to hold these strips in an upright position. It will be evident to those skilled in the art that a number of modifications may be made without departing from the spirit or scope of the invention as defined in the claims.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An electrical contact device comprising at least two contact members, one of said contact members being a stationary, resilient contact strip having one pivotable end, the other contact member being movable and disposed on one side of and spaced a predetermined distance from the pivotable end of said stationary, resilient contact strip, an absorber strip located at the other side of said resilient contact strip remote from said movable contact member, fastening means interposed between and communicating with said resilient contact strip and said absorber strip, so that said fastening means transmit to said absorber strip any oscillations imparted to said stationary, resilient contact strip by said movable contact member, whereupon said absorber strip dampens and limits said oscillations.

2. An electrical contact device comprising at least two contact members, one of said contact members being a stationary, resilient contact strip having one pivotable end, the other contact member being movable and disposed on one side of and spaced a predetermined distance from the pivotable end of said stationary, resilient contact strip, an absorber strip located at the other side of said resilient contact strip remote from said movable contact member, a bolt member interposed between and communicating with said resilient contact strip and said absorber strip, so that said bolt member transmits to said absorber strip any oscillations imparted to said stationary, resilient contact strip by said movable contact member, whereupon said absorber strip dampens and limits said oscillations.

3. An electrical contact device comprising at least two contact members, one of said contact members being a stationary, resilient contact strip having one pivotable end, the other contact member being movable and disposed on one side of and spaced a predetermined distance from the pivotable end of said stationary, resilient contact strip, an absorber strip located at the other side of said resilient contact strip remote from said movable contact member, a bolt member having two ends, one of said ends being carried by said stationary, resilient contact strip, the other end extending towards said absorber strip, said absorber strip being provided with a bifurcated slot, a guide sleeve circumjacent said bolt member and in engagement with said bifurcated slot, whereby said bolt member transmits to said absorber strip any oscillations imparted to said stationary, resilient contact strip by said movable contact member, whereupon said absorber strip dampens and limits said oscillations.

4. An electrical contact device according to claim 1, including adjustment means arranged in juxtaposition with respect to said absorber strip in order to effectuate movement of said pivotable end of said stationary, resilient contact strip, to thereby alter said predetermined distance between said contact members.

5. An electrical contact device according to claim 3, including a plate member supported by said other end of said bolt member extending toward said absorber strip, so that said plate member connects said bolt member to said absorber strip.

6. An electrical contact device according to claim 2, wherein said stationary, resilient contact strip and said absorber strip each have an inclined surface.

7. An electrical contact device comprising at least two contact members, one of said contact members being a stationary, resilient contact strip having one pivotable end, the other contact member being movable and disposed on one side of and spaced a predetermined distance from the pivotable end of said stationary, resilient contact strip, an absorber strip located at the other side of said resilient contact strip remote from said movable contact member, a hook member connecting said absorber strip with said stationary, resilient contact strip adjacent said one pivotable end, said hook member maintaining at least one of said strips elastically deformed, and adjustment means arranged in close proximity to said absorber strip for cooperation with the latter, whereby said predetermined distance between said contact members may be altered.

8. An electrical contact device according to claim 7, wherein said stationary, resilient contact strip is divided into two halves, each half carrying one electrical contact element, said absorber hook being provided with two symmetrically arranged hook portions which extend between and support each half of said stationary, resilient contact strip.

9. An electrical contact device comprising at least two contact members, one of said contact members being a stationary, resilient contact strip having one pivotable end, the other contact member being movable and disposed on one side of and spaced a predetermined distance from the pivotable end of said stationary, resilient contact strip, an absorber strip located at the other side of said resilient contact strip remote from said movable contact member, a hook member connecting said absorber strip with said stationary, resilient contact strip, said hook member engaging said stationary, resilient contact strip on one side remote from said absorber strip, to thereby permit said stationary resilient contact strip to move in a direction toward said absorber strip, so that said absorber strip dampens and limits any oscillations imparted to said stationary, resilient contact strip by said movable contact member.

References Cited in the file of this patent

UNITED STATES PATENTS

| | | |
|---|---|---|
| 2,689,894 | Wikstrom et al. | Sept. 21, 1954 |
| 2,738,400 | Hailes | Mar. 13, 1956 |
| 2,750,475 | Clason | June 12, 1956 |